United States Patent [19]

Mizuno et al.

[11] Patent Number: 5,073,447
[45] Date of Patent: Dec. 17, 1991

[54] POLYPROPYLENE-BASED RESIN COMPOSITION

[75] Inventors: Hirohide Mizuno; Shinichi Koide; Manabu Nomura, all of Ichihara; Nobuya Kawamura, Toyota; Takeyoshi Nishio, Okazaki; Takao Nomura, Toyota, all of Japan

[73] Assignees: Idemitsu Petrochemical Co., Ltd., Tokyo; Toyota Jidosha Kabushiki Kaisha, Toyota, both of Japan

[21] Appl. No.: 448,068

[22] Filed: Dec. 8, 1989

[30] Foreign Application Priority Data

Dec. 27, 1988 [JP] Japan .................. 63-327796

[51] Int. Cl.$^5$ .............................................. B32B 5/16
[52] U.S. Cl. .................................. 428/327; 428/407; 428/500; 428/403
[58] Field of Search .............. 428/407, 403, 323, 327, 428/500; 523/201; 525/902

[56] References Cited

U.S. PATENT DOCUMENTS

| | | | |
|---|---|---|---|
| 3,875,260 | 4/1975 | Patel et al. | 525/902 |
| 3,900,529 | 8/1975 | Beer | 525/902 |
| 4,528,327 | 7/1985 | Cooper et al. | 523/201 |
| 4,677,003 | 6/1987 | Redlich et al. | 428/407 |
| 4,711,913 | 12/1987 | Tateosian et al. | 525/902 |
| 4,965,130 | 10/1990 | Min et al. | 428/407 |

FOREIGN PATENT DOCUMENTS

| | | | |
|---|---|---|---|
| 1191986 | 8/1985 | Canada | 525/902 |
| 52-17055 | 5/1977 | Japan . | |
| 52-141854 | 11/1977 | Japan . | |
| 56-38338 | 4/1981 | Japan . | |
| 3635943 | 4/1987 | Japan | 523/201 |
| 64-87645 | 3/1989 | Japan . | |
| 8202208 | 7/1982 | PCT Int'l Appl. | 525/902 |

*Primary Examiner*—Merrell C. Cashion, Jr.
*Assistant Examiner*—Robert J. Follett
*Attorney, Agent, or Firm*—Frishauf, Holtz, Goodman & Woodward

[57] ABSTRACT

The polypropylene-based composite resin composition of the invention, which can be molded into a shaped article having excellent surface hardness and impact strength at low temperatures and usable as a shell plate member of automobiles, comprises (a) a polypropylene resin as the matrix phase, (b) particles of rubber-reinforced styrene-based resin as the dispersed phase having a specified area-average particle diameter, of which the rubber particles having a specified area-average particle diameter forms a "salami" structure as dispersed in the styrene-based resin, and (c) a layer of a compatibility improver, such as a styrene-based thermoplastic elastomer, on the surface of the particles of the rubber-reinforced styrene-based resin in a specified thickness.

20 Claims, 1 Drawing Sheet

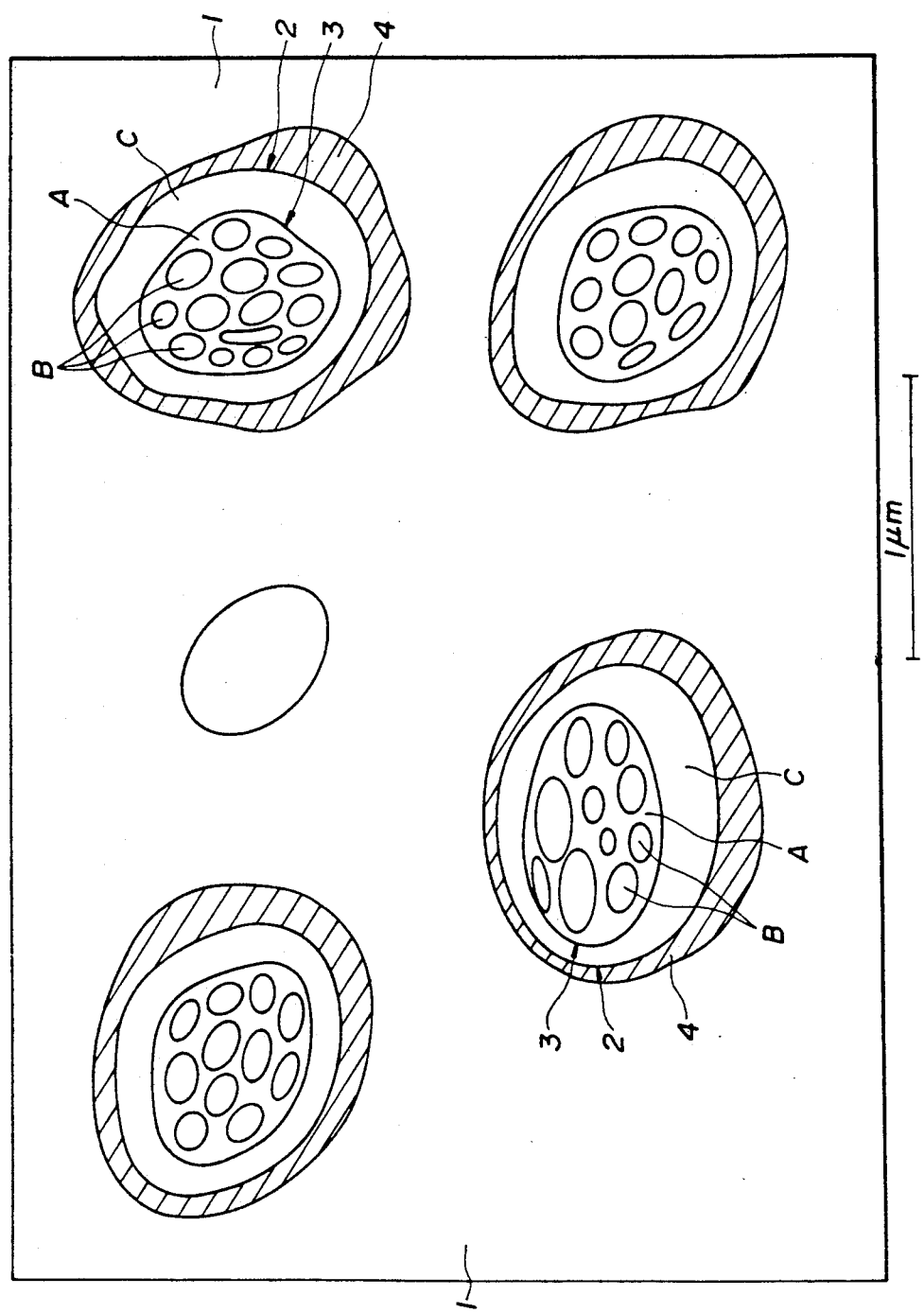

POLYPROPYLENE-BASED RESIN COMPOSITION

BACKGROUND OF THE INVENTION

The present invention relates to a polypropylene-based resin composition. More particularly, the invention relates to a polypropylene-based resin composition having excellent hardness on the surface and resistance against face-impact at low temperatures and is useful as a material of, for example, shell plates of automobiles.

BACKGROUND INFORMATION

Polypropylene resin is one of the candidates for a synthetic plastic resin as a material of shell plate members, such as bumpers, fenders and the like, in automobiles although polypropylene resins as such have a defect of relatively low impact strength at low temperatures. Accordingly, it is conventionally practiced to impart a polypropylene resin with improved properties by compounding it with an EPR and the like, but such an EPR-compounded polypropylene resin has another problem that shaped articles of the resin composition has a greatly decreased surface hardness and rigidity.

On the other hand, several attempts and proposals have been made, for example, in Japanese Patent Kokai 56-38338 and 52-141854 and Japanese Patent Publication 52-17055 to improve various properties of polypropylene resins by compounding with a polystyrene and a rubbery elastomer. These polypropylene-based resin compositions, however, each have a decreased impact strength, especially, at low temperatures so that they cannot be used as a material of shell plate members in automobiles such as bumpers, fenders and the like.

Some of the inventors have previously disclosed, in Japanese Patent Kokai 64-87645, a polypropylene-based resin composition having excellent rigidity, impact strength and solid-phase adhesion, which is a composite material composed of a polypropylene resin as a continuum of matrix phase and a styrene-based resin forming discrete particles of a specified particle diameter distributed uniformly in the matrix phase as the dispersed phase, the surface of the dispersed particles being coated with a layer of a compatibility improver having a specified thickness. The improvement achieved with such a polypropylene-based resin composition, however, is still insufficient relative to the impact strength, especially, at low temperatures when the resin composition is used as a material of shell plate members in automobiles.

SUMMARY OF THE INVENTION

The present invention accordingly has an object to provide a novel and improved polypropylene-based resin composition capable of giving a shaped article having excellent impact strength even at a very low temperature and useful as a shell plate member of automobiles.

Thus, the polypropylene-based resin composition of the present invention is a quaternary composite composed of a polypropylene resin, a styrene-based polymer, a rubbery polymer and a compatibility improver, which comprises: (a) a matrix phase formed of the polypropylene resin; (b) a particulate dispersed phase distributed in the matrix phase and formed of a rubber-reinforced styrene-based resin, the particles of the rubber-reinforced styrene-based resin having an area-average particle diameter not exceeding 5 μm and having such a structure that rubber particles of a "salami" structure having an area-average particle diameter of 0.5 to 1.5 μm are dispersed in the styrene-based resin; and (c) a coating layer of the compatibility improver formed on the surface of the particles of the rubber-reinforced styrene-based resin and having a thickness of 0.05 to 0.5 μm.

BRIEF DESCRIPTION OF THE DRAWING

The FIGURE is a schematic illustration of the composite structure of the inventive polypropylene-based resin composition.

DETAILED DESCRIPTION OF THE PREFERRED EMBODIMENTS

As is described above, the inventive polypropylene-based resin composition is a composite material composed of a matrix phase of a polypropylene resin and particles of a styrene-based resin as a dispersed phase in the matrix. Different from conventional resin compositions of such a type, the particles as the dispersed phase are formed, not from a styrene-based resin as such, but from a rubber-reinforced styrene-based resin to have a "salami" structure composed of a styrene-based resin and rubber particles dispersed therein. Having such a unique and specifically controlled morphology, the inventive resin composition is imparted with a greatly improved balance of the physical properties and is useful as a material of shell plate members of automobiles such as bumpers, fenders and the like.

In addition to the above described constituents (a), (b) and (c), it is optional that the resin composition of the invention further contains particles of other types provided that the surface of such particles is formed from the compatibility improver including particles of the compatibility improver alone and particles of the styrene-based resin alone coated with the compatibility improver.

Various kinds of propylene-based resins can be used as the resin forming the matrix of the inventive resin composition including not only homopolymeric polypropylene resins but also various kinds of copolymeric resins having crystallinity of which the principal monomeric constituent is propylene with one or more of comonomers. Examples of the monomeric compound copolymerizable with propylene include ethylene, butene, pentene, hexene, 2-methyl butene-1, 4-methyl butene-1, 2-methyl pentene-1, 4-methyl pentene-1, vinyl cyclohexane, 1,5-hexasiene, 1,7-octadiene, 3-methyl 1,4-hexadiene, 4-methyl 1,4-hexadiene and the like. The polypropylene resin should have a melt index (MI) of 1 to 60 g/10 minutes or, preferably, 5 to 55 g/10 minutes. When the melt index of the polypropylene resin is too small, the resin composition prepared therefrom would be poor in the moldability. When the melt index of the polypropylene resin is too large, on the other hand, the resin composition prepared therefrom cannot give a shaped article having high impact strength.

The particles as the dispersed phase in the matrix phase of the above described polypropylene resin are formed from a rubber-reinforced styrene-based resin which is obtained from a styrene-based polymer and a rubbery polymer.

The styrene-based polymer mentioned above includes homopolymeric polystyrene resins and copolymeric resins of styrene with one or more of monomers copolymerizable with styrene. Examples of the copolymerizable monomers include α-methyl styrene, vinyl toluene, vinyl ethyl benzene, vinyl xylene, p-tert-butyl styrene, α-methyl-p-methyl styrene, vinyl naphthalene and other aromatic monovinyl compounds, acrylonitrile, methyl methacrylate, methyl acrylate, methacrylic acid, acrylic acid, maleic anhydride, phenyl maleimide and the like. These comonomers can be used either singly or as a combination of two kinds or more according to need. The amount of the comonomer or the total amount of the comonomers should not exceed 50% by weight or, preferably, 40% by weight based on the overall amount of the monomers including styrene.

Various kinds of rubbery polymers can be used without particular limitations as a modifying agent of the above described styrene-based resin to give a rubber-reinforced styrene-based resin including those conventionally used in the preparation of rubber-modified styrene-based resin compositions. Suitable rubbers include natural rubber, synthetic rubber such as polybutadiene rubbers, polyisoprene rubbers, styrene-butadiene copolymeric rubbers, styrene-isoprene copolymeric rubbers, butyl rubbers, ethylene-propylene copolymeric rubbers and the like as well as graft-copolymers of styrene with these rubbery polymers.

The rubber-reinforced styrene-based resin, which is prepared from the above described styrene-based polymer and rubbery polymer, is dispersed in the matrix of the polypropylene resin in the form of particles having an area-average particle diameter not exceeding 5 μm or, preferably, in the range from 0.5 to 2.5 μm. When the area-average particle diameter of the particles of the rubber-reinforced styrene-based resin is too large, exfoliation peeling may sometimes be caused in the resin composition to decrease the impact strength of the article shaped from the resin composition. The above mentioned area-average particle diameter $D_s$ is a value obtained from the particle diameters D of 1000 particles by the calculation with the equation $$D_s = \Sigma nD^3 / \Sigma nD^2,$$

in which n is the number of the particles having a diameter D.

The particles of the above described rubber-reinforced styrene-based resin as the dispersed phase have a structure in which rubber particles of a "salami" structure having an area-average particle diameter of 0.5 to 1.5 μm or, preferably, 0.7 to 1.3 μm are dispersed. When the area-average particle diameter of the rubber particles having a "salami" structure exceeds 1.5 μm, the composition may have a decreased surface hardness while, when it is smaller than 0.5 μm, no improvement can be obtained in the impact strength of the articles shaped from the resin composition.

The "salami" structure here implied is a structure in which particles of a styrene-based polymer are sporadically distributed in the rubbery matrix phase forming the rubber particle. FIG. 1 of the accompanying drawing schematically illustrates the structure of the inventive resin composition. The rubber particles 3 have a "salami" structure in which particles of a styrene-based polymer B are sporadically distributed in the matrix phase A of a rubber. The rubber particles 3 having a "salami" structure are contained in the styrene-based polymer C to form a particle 2 of the rubber-reinforced styrene-based resin. The particles 2 of the rubber-reinforced styrene-based resin are each coated with a layer 4 of the compatibility improver to form the dispersed phase of particles distributed in the continuum of the matrix phase made from the polypropylene resin 1.

The rubber-reinforced styrene resin described above can be prepared by a known method such as the method of emulsion polymerization, bulk polymerization, solution polymerization and suspension polymerization as well as a two-step method of bulk polymerization and suspension polymerization. In the following, the above mentioned two step method is described in some detail.

In the first place, a rubbery polymer is added to styrene or a monomeric mixture of styrene and a copolymerizable monomer and dissolved therein, if necessary, by heating as uniformly as possible. In the next place, this solution is admixed with a chain transfer agent such as an alkyl mercaptan and the like to serve as a molecular weight-controlling agent and, if necessary, a polymerization initiator such as an organic peroxide and the mixture is agitated at a temperature of 70 to 150° C. to effect bulk polymerization of the styrene or the monomer mixture until the conversion of the monomer or monomers reaches 10 to 60%. In this preliminary polymerization as the first step, the rubbery polymer is dispersed in a particulate form.

Thereafter, the syrupy mixture obtained by the preliminary polymerization is dispersed in an aqueous medium containing a suspending agent such as calcium phosphate, polyvinyl alcohol and the like and the suspension polymerization as the second step polymerization is conducted until almost 100% of the monomer conversion is obtained. If necessary, heating of the polymerization mixture is further continued after completion of the second step polymerization.

Examples of the chain transfer agent added to the polymerization mixture include a dimer of α-methyl styrene and n-dodecyl mercaptan, tert-dodecyl mercaptan, 1-phenylbutene--fluorene, dipentene, chloroform and the like among mercaptan compounds, terpene compounds and organic halogen compounds.

Examples of the polymerization initiator used according to need include organic peroxides such as peroxy ketals, e.g., 1,1-bis(tert-butylperoxy) cyclohexane and 1,1-bis(tert-butyl-peroxy)-3,3,5-trimethyl cyclohexane, dialkyl peroxides, e.g., dicumyl peroxide, di-tert-butyl peroxide and 2,5-dimethyl-2,5-di(tert-butylperoxy) cyclohexane, diacyl peroxides, e.g., benzoyl peroxide and m-toluoyl peroxide, peroxy dicarbonates, e.g., dimyristylperoxy dicarbonate, peroxy esters, e.g., tert-butylperoxy isopropyl carbonate, ketone peroxides, e.g., cyclohexanone peroxide, hydroperoxides, e.g., p-menthane hydroperoxide, and the like.

The particle diameter or distribution thereof and structure of the particles of the rubbery polymer can be controlled by adequately selecting the velocity of agitation of the polymerization mixture and the amount of the chain transfer agent added thereto. The amount of gel fraction and the swelling index can be controlled by adequately selecting the factors such as the amount of the polymerization initiator, reaction temperature, reaction time and the like.

The polymerizate slurry obtained in the above described manner is processed according to a conventional procedure to obtain the bead-like product which is dried and pelletized to give the rubber-reinforced styrene-based resin. It is preferable that the rubber-reinforced styrene-based resin has a melt index MI in the range from 0.5 to 20 g/10 minutes or, more preferably, from 1 to 15 g/10 minutes.

In the resin composition of the present invention, the particles of the rubber-reinforced styrene-based resin to give the dispersed phase are coated with a layer of a compatibility improver having a thickness in the range from 0.05 to 0.5 μm or, preferably, from 0.06 to 0.3 μm in order to improve the uniformity in the distribution of the particles of the rubber-reinforced styrene-based resin in the matrix of the polypropylene resin by increasing the compatibility of the two phases at the interface. Preferable compatibility improvers include styrene-based thermoplastic elastomers such as copolymers of styrene and butadiene, copolymers of styrene and isoprene and the like. When the thickness of the coating layer of the compatibility improver is too small, shaped articles of the resin composition cannot be imparted with fully improved impact strength. When the thickness thereof is too large, on the other hand, the shaped articles undesirably may have decreased rigidity. Thickness of the coating layer can be controlled by adequately selecting the relative amounts of the rubber-reinforced styrene-based resin and the compatibility improver as well as the particle diameter of the resin particles as the dispersed phase. The thickness of the layer of the compatibility improver mentioned above refers to an average of the values of $(T_1+T_2)/2$ obtained for 1000 particles of the dispersed phase where $T_1$ and $T_2$ are the values of the thickness of the layer at the two ends of the largest diameter in the respective particles.

The compounding proportion of the polypropylene resin as the matrix phase and the rubber-reinforced styrene-based resin as the dispersed phase should be such that the amount of the rubber-reinforced styrene-based resin is in the range from 5 to 30% by weight or, preferably, from 7 to 25% by weight based on the total amount of the polypropylene resin and the rubber-reinforced styrene-based resin. When the amount of the rubber-reinforced styrene-based resin is too small, the resin composition cannot give a shaped article having an increased surface hardness. When the amount thereof is too large, the resin composition may suffer from a decrease in the heat resistance.

As is mentioned above, the compounded amount of the compatibility improver should be sufficient to give a coating layer thereof on the surface of the particles of the rubber-reinforced styrene-based resin having a thickness in the range from 0.05 to 0.5 μm. Such a thickness of the coating layer can be obtained when the amount of the compatibility improver is in the range from 5 to 20 parts by weight or, preferably, from 7 to 15 parts by weight per 100 parts by weight of the total amount of the polypropylene resin and the rubber-reinforced styrene-based resin. When the amount of the compatibility improver is too small, the rubber-reinforced styrene-based resin sometimes is not dispersed in a particulate form, but forms a lamellar structure resulting in a decrease in the dimensional stability and impact strength of the shaped articles of the resin composition. When the amount thereof is too large, on the other hand, an undesirable decrease may be caused in the heat resistance of the resin composition.

It is desirable that the ratio of the melt index of the rubber-reinforced styrene-based resin, referred to as MI(PS), to the melt index of the polypropylene resin, referred to as MI(PP), i.e. MI(PS):MI(PP), is in the range from 0.5 to 0.01. When this ratio is smaller than 0.01, phase separation may be caused between the matrix phase of the polypropylene resin and the dispersed phase of the rubber-reinforced styrene-based resin resulting in a decrease in the impact strength of the shaped articles of the resin composition. When this ratio exceeds 0.5, on the other hand, the impact strength of the shaped article of the resin composition is also decreased.

It is optional that the polypropylene-based resin composition of the invention is further admixed with various kinds of known additives conventionally used in resin compositions. Examples of the additives include, for example, lubricants such as stearic acid, behenic acid, zinc stearate, calcium stearate, magnesium stearate, ethylene bisstearoamide and the like, organopolysiloxanes, mineral oils, hindered phenolic compounds such as 2,6-di-tert-butyl-4-methyl phenol, stearyl-β-(3,5-di-tert-butyl-4-hydroxyphenyl) propionate, triethylene glycol bis-3-(3-tert-butyl-4-hydroxy-5-methyl phenyl) propionate and the like and phosphorus compounds such as tri(2,4-di-tert-butyl phenyl) phosphite, 4,4'-butylidene bis(3-methyl-6-tert-butyl phenyl-ditridecyl) phosphite and the like as an anti-oxidant, ultraviolet absorbers, flame retardant agents, anti-static agents, mold-release agents, plasticizers, dyes, pigments, various kinds of fillers and so on. It is also optional that the inventive resin composition is compounded with polymers of other types such as polyphenylene ethers and the like.

The polypropylene-based resin composition of the present invention can be prepared by mixing the above described essential and optional ingredients each in a specified amount and thoroughly kneading the blend at a temperature of 180 to 240° C. by use of a suitable blending machine such as Banbury mixers, single-screw extruder machines, double-screw extruder machines, co-kneaders, multi-screw extruder machines and the like. The resin composition of the invention can be molded into shaped articles by any known molding method such as injection molding method, extrusion molding method and the like.

According to the present invention, a shaped article having excellent surface hardness and impact strength even at low temperatures as well as mechanical properties such as heat resistance, rigidity and the like, and usable as a shell plate member in automobiles such as bumpers, fenders and the like can be obtained.

In the following, the polypropylene-based resin composition of the present invention is described in more detail by way of examples. The description below is for the measurement of the area-average particle diameter of the rubber particles having a "salami" structure and the dispersed phase particles of the rubber-reinforced styrene-based resin given in the examples below.

Thus, the sample was stained successively first with ruthenium tetraoxide and then with osmium tetraoxide to take an electron microscopic photograph on a transmission-type electron microscope from which the rubber particles having a "salami" structure and the rubber-reinforced styrene-based resin particles as the dispersed phase could be identified. The diameter of the particles of the respective types was measured for 1000 particles and the area-average particle diameter $D_s$ was calculated from the equation $$D_s = \Sigma nD^3 / \Sigma nD^2,$$

in which n is the number of the particles having a diameter D.

PREPARATION EXAMPLE 1

A rubber-reinforced styrene-based polymer was prepared in the following manner.

Thus, a polymerization mixture composed of:
4.8% by weight of a low-cis-polybutadiene rubber (Diene ®NF35AS, a product by Asahi Kasei Co.);
91.2% by weight of styrene;
5.9% by weight of ethyl benzene;
0.02% by weight of 1,1-bis(tert-butylperoxy) 3,3,5-trimethyl hexane;
0.01% by weight of n-dodecyl mercaptan; and
0.07% by weight of antioxidant (Irganox ®1076, a product by Ciba Geigy Co.), was continuously introduced at a rate of 6 liters/hour into a first polymerization reactor of 7.9 liters capacity kept at a temperature of 110° C. The polymerization mixture discharged out of this first polymerization reactor contained 21% by weight of non-volatile matters.

The polymerization mixture coming out of the first polymerization reactor was introduced successively into a series of polymerization reactors consisting of a second reactor of 8.5 liters capacity, third reactor of 11 liters capacity and fourth reactor of also 11 liters capacity kept at temperatures of 110 to 180° C. to effect the polymerization of the styrene monomer. Finally, the polymerization mixture pre-heated at 240 to 270° C. was stripped of the volatile matters in a vacuum vessel to give a rubber-reinforced styrene-based polymer in the form of pellets. The content of the rubbery polymer in the thus obtained rubber-reinforced styrene-based polymer was estimated to be 5.5% by weight as calculated from the content thereof in the starting polymerization mixture and the amount of the product.

The area-average particle diameter of the rubber particles dispersed in the styrene-based polymer could be controlled by suitably selecting the rotating velocity of the stirrer in the first polymerization reactor, which was kept at 220 rpm so that the rubber particles having a "salami" structure had an area-average particle diameter of 0.7 μm. The melt index of the rubber-reinforced styrene-based resin could be controlled by means of adjustment of the temperatures in the third and fourth polymerization reactors and the above mentioned running conditions gave a melt index of 2.0 g/10 minutes.

PREPARATION EXAMPLE 2

A second rubber-reinforced styrene-based polymer was prepared in substantially the same manner as in Preparation Example 1 except that the rotating velocity of the stirrer in the first polymerization reactor was 200 rpm instead of 220 rpm so that the area-average particle diameter of the rubber particles having a "salami" structure was 0.95 μm and the temperatures of the third and the fourth polymerization reactors were controlled so as to give a melt index of 1.5 g/10 minutes of the resin.

PREPARATION EXAMPLE 3

A third rubber-reinforced styrene-based polymer was prepared in substantially the same manner as in Preparation Example 1 except that the rotating velocity of the stirrer in the first polymerization reactor was 165 rpm instead of 220 rpm so that the area-average particle diameter of the rubber particles having a "salami" structure was 1.3 μm and the temperatures of the third and the fourth polymerization reactors were controlled so as to give a melt index of 1.8 g/10 minutes of the resin.

PREPARATION EXAMPLE 4

A fourth rubber-reinforced styrene-based polymer was prepared in substantially the same manner as in Preparation Example 1 except that the rotating velocity of the stirrer in the first polymerization reactor was 110 rpm instead of 220 rpm so that the area-average particle diameter of the rubber particles having a "salami" structure was 2.0 μm and the temperatures of the third and the fourth polymerization reactors were controlled so as to give a melt index of 2.3 g/10 minutes of the resin.

EXAMPLE 1

A dry polymer blend was prepared from 85 parts by weight of a block-copolymerized polypropylene containing 1.6% by weight of the ethylene moiety and having a melt index of 10 g/10 minutes, 15 parts of the first rubber-reinforced styrene-based polymer prepared in Preparation Example 1 containing 5.5% by weight of the polybutadiene rubber and having a melt index of 2.0 g/10 minutes, of which the area-average particle diameter of the rubber particles having a "salami" structure was 0.7 μm, and 12 parts by weight of a styrene-butadiene-styrene block copolymer, referred to as the SBS hereinbelow, (Califlex TR 1102, a product by Shell Chemical Co.) as a compatibility improver and the polymeric blend was kneaded at 200° C. in a single-screw kneader rotating at a velocity of 80 rpm to give pellets of the resin composition.

The resin pellets were molded by the method of injection molding into various forms of test pieces for the measurements of the respective physical properties listed below to give the results shown in Table 1. Further, sections of the pellets were examined with an electron microscope to determine the area-average particle diameter of the particles as the dispersed phase and the thickness of the layer of the compatibility improver to give the results also shown in Table 1.

Item 1: Izod impact strength at 23° C. in kg.cm/cm, determined according to JIS K 7110 with notched specimens.

Item 2: Izod impact strength at −30° C. in kg.cm/cm, determined according to JIS K 7110 with notched specimens.

Item 3: type of fracture by face impact using an automatic hammer-drop tester with a load of 3.8 kg and a dropping velocity of 5 meters/second;
B: brittle fracture, D: ductile fracture.

Item 4: elastic modulus by bending in kg/cm$^2$, determined according to ASTM D790.

Item 5: Rockwell hardness in R scale, determined according to ASTM D785.

Item 6: temperature of thermal deformation, ° C., under 66 psi, determined according to ASTM D648.

Item 7: area-average particle diameter of the dispersed phase particles in μm.

Item 8: thickness of the layer of the compatibility improver in μm.

EXAMPLE 2

The experimental procedure was substantially the same as in Example 1 except that the resin composition was compounded with 70 parts by weight of the same polypropylene resin, 30 parts by weight of the same rubber-reinforced styrene-based polymer and 12 parts by weight of the SBS. The results obtained by the tests are shown in Table 1.

EXAMPLE 3

The experimental procedure was substantially the same as in Example 1 except that the resin composition was compounded with 70 parts by weight of the same polypropylene resin, 30 parts by weight of another rubber-reinforced styrene-based polymer obtained in Preparation Example 2 containing 5.5% by weight of the polybutadiene rubber and having a melt index of 1.5 g/10 minutes, of which the area-average particle diameter of the rubber particles having a "salami" structure was 0.95 μm and 10 parts by weight of the SBS. The results obtained by the tests are also shown in Table 1.

EXAMPLE 4

The experimental procedure was substantially the same as in Example 3 except that the resin composition was compounded with 75 parts by weight of the same polypropylene resin, 25 parts by weight of the same rubber-reinforced styrene-based resin and 10 parts by weight of the SBS. The results obtained by the tests are also shown in Table 1.

EXAMPLE 5

The experimental procedure was substantially the same as in Example 1 except that the resin composition was compounded with 85 parts by weight of the same polypropylene resin, 15 parts by weight of another rubber-reinforced styrene-based polymer obtained in Preparation Example 3 containing 5.5% by weight of the polybutadiene rubber and having a melt index of 1.8 g/10 minutes, of which the area-average particle diameter of the rubber particles having a "salami" structure was 1.3 μm, and 10 parts by weight of the SBS. The results obtained by the tests are also shown in Table 1.

COMPARATIVE EXAMPLE 1

The experimental procedure was substantially the same as in Example 1 excepting replacement of the rubber-reinforced styrene-based polymer with the same amount of another rubber-reinforced styrene-based polymer obtained in Preparation Example 4 containing 5.5% by weight of the polybutadiene rubber and having a melt index of 2.3 g/10 minutes, of which the area-average particle diameter of the rubber particles having a "salami" structure was 2.0 μm. The results obtained by the tests are also shown in Table 1.

COMPARATIVE EXAMPLE 2

The experimental procedure was substantially the same as in Example 1 except that the resin composition was compounded with 85 parts by weight of the same polypropylene resin, 15 parts by weight of a general-purpose polystyrene resin having a melt index of 2.1 g/10 minutes and 18 parts by weight of the SBS. The results obtained by the tests are also shown in Table 1.

COMPARATIVE EXAMPLE 3

The experimental procedure was substantially the same as in Example 1 except that no SBS was used at all. The results obtained by the tests are also shown in Table 1.

TABLE 1

| Item No. | 1 | 2 | 3 | 4 | 5 | 6 | 7 | 8 |
|---|---|---|---|---|---|---|---|---|
| Example 1 | 26.0 | 7.5 | D | 15000 | 66 | 101 | 0.9 | 0.10 |
| Example 2 | 27.4 | 8.1 | D | 14400 | 64 | 99 | 0.9 | 0.08 |
| Example 3 | 24.3 | 7.2 | D | 15300 | 66 | 102 | 1.2 | 0.08 |
| Example 4 | 24.6 | 7.3 | D | 15100 | 63 | 101 | 1.2 | 0.09 |
| Example 5 | 24.5 | 7.3 | D | 15100 | 64 | 101 | 1.6 | 0.08 |
| Comparative Example 1 | 19.8 | 6.8 | B | 15500 | 59 | 98 | 2.5 | 0.12 |
| Comparative Example 2 | 17.4 | 6.5 | B | 15700 | 58 | 99 | 0.7 | 0.16 |
| Comparative Example 3 | 6.8 | 2.4 | B | 16800 | 75 | 96 | 8.5 | — |

What is claimed is:

1. A polypropylene-based composite resin composition which comprises:
   (a) a matrix phase formed of a polypropylene resin;
   (b) a particulate dispersed phase distributed in the matrix phase and formed of a rubber-reinforced styrene-based resin, the particles of the rubber-reinforced styrene-based resin having an area-average particle diameter not exceeding 5 μm and having such a structure that rubber particles of a "salami" structure having an area-average particle diameter of 0.5 to 1.5 μm are dispersed in the styrene-based resin; and
   (c) a coating layer of a compatibility improver formed on the surface of the particles of the rubber-reinforced styrene-based resin and having a thickness of 0.05 to 0.5 μm.

2. The polypropylene-based composite resin composition as claimed in claim 1 wherein the weight ratio of the polypropylene resin and the rubber-reinforced styrene-based resin is from 70:30 to 95:5.

3. The polypropylene-based composite resin composition as claimed in claim 1 wherein the amount of the compatibility improver is from 5 to 20 parts by weight per 100 parts by weight of the total amount of the polypropylene resin and the rubber-reinforced styrene-based resin.

4. The polypropylene-based composite resin composition as claimed in claim 1 wherein the polypropylene resin has a melt index from 1 to 60 g/10 minutes.

5. The polypropylene-based composite resin composition as claimed in claim 1 wherein the rubber reinforcing the styrene-based resin is selected from the group consisting of natural rubber, polybutadiene rubbers, polyisoprene rubbers, copolymeric rubbers of styrene and butadiene, copolymeric rubbers of styrene and isoprene, butyl rubbers, copolymeric rubbers of ethylene and propylene and styrene-grafted copolymeric rubbers thereof.

6. The polypropylene-based composite resin composition as claimed in claim 1 wherein the particles of the rubber-reinforced styrene-based resin have an area-average particle diameter from 0.5 to 2.5 μm.

7. The polypropylene-based composite resin composition as claimed in claim 1 wherein the rubber-reinforced styrene-based resin has a melt index from 0.5 to 20 g/10 minutes.

8. The polypropylene-based composite resin composition as claimed in claim 1 wherein the compatibility improver is a styrene-based thermoplastic elastomer.

9. The polypropylene-based composite resin composition as claimed in claim 1 wherein the ratio of the melt index of the polypropylene resin and the melt index of the rubber-reinforced styrene-based resin is from 0.01 to 0.5.

10. The polypropylene-based composite resin composition as claimed in claim 1 wherein the rubber particles have an area-average particle diameter from 0.7 to 1.3 μm.

11. The polypropylene-based composite resin composition as claimed in claim 4 wherein the polypropylene has a melt index in the range from 5 to 55 g/10 minutes.

12. The polypropylene-based composite resin composition as claimed in claim 1 wherein the layer of the compatibility improver has a thickness in the range from 0.06 to 0.3 μm.

13. The polypropylene-based composite resin composition as claimed in claim 7 wherein the rubber-reinforced styrene-based resin has a melt index in the range from 1 to 15 g/10 minutes.

14. The polypropylene-based composite resin composition as claimed in claim 2 wherein the weight ratio of the polypropylene resin and the rubber-reinforced styrene-based resin is in the range from 75:25 to 93:7.

15. The polypropylene-based composite resin composition as claimed in claim 3 wherein the amount of the compatibility improver is from 7 to 15 parts by weight per 100 parts by weight of the total amount of the polypropylene resin and the rubber-reinforced styrene-based resin.

16. The polypropylene-based composite resin composition as claimed in claim 8 wherein the styrene-based thermoplastic elastomer is a copolymer of styrene and butadiene or a co-polymer of styrene and isoprene.

17. The polypropylene-based composite resin composition as claimed in claim 2, wherein the polypropylene resin is a copolymer of propylene and a monomer selected from the group consisting of ethylene, butene, pentene, hexene, 2-methyl butene-1,4-methyl butene-1,2-methyl-pentene-1, vinyl cyclohexane, 1,5-hexasiene, 1,7-octadiene, 3-methyl 1,4-hexadiene and 4-methyl hexasiene, 1,7-octadiene, 3-methyl 1,4-hexadiene and 4-methyl 1,4-hexadiene.

18. The polypropylene-based composite resin composition as claimed in claim 17, wherein the styrene based resin comprises styrene and at least one monomer selected from the group consisting of α-methyl styrene, vinyl toluene, vinyl ethyl styrene, vinyl naphthalene, acrylonitrile, methyl methacrylate, methyl acrylate, methacrylic acid, acrylic acid, maleic anhydride and phenylmaleimide.

19. The polypropylene-based composite resin composition as claimed in claim 2, wherein the amount of the compatibility improver is from 5 to 20 parts by weight per 100 parts by weight of the total amount of the polypropylene resin and the rubber-reinforced styrene-based resin;

the polypropylene resin has a melt index of 1 to 60 g/10 minutes;

the rubber reinforcing the styrene-based resin is selected from the group consisting of natural rubber, polybutadiene rubbers, polyisoprene rubbers, copolymeric rubbers of styrene and isoprene, butyl rubbers, copolymeric rubbers of ethylene and propylene and styrene-grafted copolmeric rubbers thereof;

the particles of the rubber-reinforced styrene-based resin have an area-average particle diameter from 0.5 to 2.5 μm;

the rubber-reinforced styrene-based resin has a melt index from 0.5 to 20 g/10 minutes;

the compatibility improver is a styrene-based thermoplastic elastomer;

the ratio of the melt index of the polypropylene resin and the melt index of the rubber-reinforced styrene-based resin is from 0.1 to 0.5;

the rubber particles have an area-average particle diameter from 0.7 to 1.3 μm; and the layer of the compatibility improver has a thickness from 0.06 to 0.3 μm.

20. The polypropylene based composite resin according to claim 19, wherein the polypropylene has a melt index of 5 to 55 g/10 minutes;

the rubber-reinforced styrene-based resin has a melt index of 1 to 15 g/10 minutes;

the weight ratio of the polypropylene resin and the rubber-reinforced styrene-based resin from 75:25 to 93:7;

the amount of the compatibility improver is from 7 to 15 parts by weight per 100 parts by weight of the total amount of the polypropylene resin and the rubber-reinforced styrene-based resin; and the styrene-based thermoplastic elastomer is a copolymer of styrene and butadiene or a copolymer of styrene and isoprene.

* * * * *